(12) United States Patent
Putnam et al.

(10) Patent No.: US 11,004,573 B2
(45) Date of Patent: May 11, 2021

(54) CONCENTRATED QUANTUM MECHANICALLY ENTANGLED PARTICLE COUPLES AND METHOD FOR MAKING THE SAME

(71) Applicant: ARIAT Innovations, West Des Moines, IA (US)

(72) Inventors: Everly Dean Putnam, West Des Moines, IA (US); David J. Kaufman, West Des Moines, IA (US)

(73) Assignee: ARIAT Innovations, West Des Moines, IA (US)

( * ) Notice: Subject to any disclaimer, the term of this patent is extended or adjusted under 35 U.S.C. 154(b) by 0 days.

(21) Appl. No.: 16/264,060

(22) Filed: Jan. 31, 2019

(65) Prior Publication Data
US 2019/0267150 A1 Aug. 29, 2019

Related U.S. Application Data

(60) Provisional application No. 62/676,466, filed on May 25, 2018, provisional application No. 62/625,478, filed on Feb. 2, 2018.

(51) Int. Cl.
*G21K 5/04* (2006.01)
*G21K 1/16* (2006.01)
(Continued)

(52) U.S. Cl.
CPC ............... *G21K 5/04* (2013.01); *G21K 1/00* (2013.01); *G21K 1/08* (2013.01); *G21K 1/093* (2013.01); *G21K 1/16* (2013.01); *H04B 10/70* (2013.01)

(58) Field of Classification Search
CPC .. G21K 5/04; G21K 1/00; G21K 1/08; G21K 1/093; G21K 1/16; H04B 10/70
See application file for complete search history.

(56) References Cited

U.S. PATENT DOCUMENTS

| | | | | |
|---|---|---|---|---|
| 2002/0093632 A1* | 7/2002 | Teich | ................... | G03B 27/00 355/18 |
| 2004/0078421 A1* | 4/2004 | Routt | ................... | H04L 9/0852 709/201 |

(Continued)

OTHER PUBLICATIONS

Desbrandes, Robert, Intercontinental quantum liaisons between entangled electrons in ion traps of thermoluminescent crystals, 11 pages, Louisiana State University, Baton Rouge, USA and Oklahoma State University, Stillwater, USA.

(Continued)

*Primary Examiner* — Dah-Wei D. Yuan
*Assistant Examiner* — Kristen A Dagenais-Englehart
(74) *Attorney, Agent, or Firm* — Zarley Law Firm, P.L.C.

(57) ABSTRACT

The present invention relates to a method creating highly concentrated quantum entangled particles which can be embedded into substrates such that the particles, and therefore substrates they are embedded upon are remotely controllable. The invention includes streaming a beam of particles through a beam splitter and then applying a selected correlation system, such as NMR or supercooling, to the particles in order to align the particle spins. The particles are then released from the correlation system resulting in an unnaturally high saturation of concentrated quantum entangled particles on a macro scale. The particles and substrates are then in a salve-x relationship configuration and are therefore remotely controllable. Through stimulation and detection, changes in state may be observable in order to determine the level of concentration and remote control.

18 Claims, 11 Drawing Sheets

(51) Int. Cl.
  *G21K 1/093* (2006.01)
  *G21K 1/08* (2006.01)
  *G21K 1/00* (2006.01)
  *H04B 10/70* (2013.01)

(56) References Cited

U.S. PATENT DOCUMENTS

2007/0272862 A1* 11/2007 Desbrandes ........... H04B 10/90 250/337
2013/0266328 A1* 10/2013 Paller ..................... H04B 10/25 398/135

OTHER PUBLICATIONS

Hartnett, Kevin, Mathematicians Tame Rogue Waves, Lighting Up Future of LEDs, Quanta Magazine, Aug. 22, 2017, 14 pages.

Jursinic, Paul A., Characterization of optically stimulated luminescent dosimeters, OSLDs, for clinical dosimetric measurements; Am. Assoc. Phys. Med., Nov. 9, 2007, pp. 4594-4604, Med. Phys. vol. 34 No. 12.

Micadei, Kaonan, Reversing the thermodynamic arrow of time using quantum correlations, arXiv.org > quant-ph > arXiv:1711.03323, Nov. 9, 2017, 9 pages.

Musser, George, Quantum Weirdness Now a Matter of Time, Quanta Magazine, Jan. 19, 2016, 6 pages.

Van Gent, Daniel L., Experiments of Quantum Communication using entangled metastable systems, Mar. 2017, 26 pages, Louisiana State University, Baton Rouge, USA and Oklahoma State University, Stillwater, USA. https://www.researchgatenetpublication/316853547.

Van Gent, D. L., Remote Stimulated Triggering of Quantum Entangled Photoluminescent Molecules of Strontium Aluminate, PACS Ref: 78.55.-m, 2005, 14 pages, Louisiana State University, Baton Rouge, USA.

University of Chicago, Quantum entanglement achieved at room temperature in semiconductor wafers, 3 pages.https://ime.uchicago.edu/about/news/quantum_entanglement_achieved_at_room_temperature_in_semiconductor_wafers.

* cited by examiner

CONCENTRATED QUANTUM MECHANICALLY ENTANGLED PARTICLE COUPLES AND METHOD FOR MAKING THE SAME

CROSS REFERENCE TO RELATED APPLICATION

This application claims the benefit of priority from Provisional Application No. 62/676,466 filed May 25, 2018, and Provisional Application No. 62/625,478 filed Feb. 2, 2018, the content of these applications is hereby incorporated by reference in their entirety.

BACKGROUND OF THE INVENTION

The present disclosure generally relates to quantum mechanical manipulation methods and, more particularly, to methods of manipulating and increasing the concentration and durability of entangled particle couples configured to remotely control the atomic structure of multiple atoms, lattice structures, and compounds on a macroscopic and commercially viable level. More specifically, and without limitation, this invention relates to a method that includes creating unnaturally concentrated quantum entangled particles by selectively controlling an input stream of particles, exposing the particles to a correlation system to align spin, and releasing the particles from the correlation system thereafter, thereby increasing the concentration of entanglement. The particles are then coupled with one or more substrates resulting in entanglement throughout the substrate, and the particles and/or substrates are subsequently stimulated in order to change characteristics of one or more substrate pairs and detecting those changes in order to ensure quality control, and then applying the product in various commercial applications for the modified substrates, including but not limited to, remote microchip manipulation, or slave-x relationship.

A basic tenet of quantum theory is Heisenberg's uncertainty principle:

$$\sigma_x \sigma_y \geq \frac{\hbar}{2}$$

As such, the fundamental limit to the precision with which certain pairs of physical properties of a particle, known as complementary variables, such as the standard deviation of position σx and standard deviation of momentum σy of two complementary quantum state variables x and y, can be known where $\hbar$ is Planck's constant reduced:

$$\hbar = \frac{h}{2\pi}$$

The more precisely the position of some particle is determined, the less precisely the momentum can be known and vice versa.

Another basic tenet of quantum mechanics is superposition and interference. Superposition observes that much like waves in classic physics, i.e., wave packets composed of superposed waves, or compounded together, quantum states behave similarly which may then be separated by the Fourier transform. Any two or more quantum states can be superposed and the result will be another valid quantum state; and conversely, that every quantum state can be represented as a sum of two or more other distinct states. An example of physically observable manifestation of superposition is interference peaks from a photon wave in a double-slit experiment. As such, quantum superposition demonstrates the wave-like properties of quantum particles.

According to the classically known double-slit experiment example as shown in FIG. 1, a laser illuminates a screen in which two narrow, closely spaced slits have been cut. The light that passes through the slit falls upon a second screen. The result is not two spots of light but rather an interference pattern consisting of a large number of light and a dark stripes thereby demonstrating the wave-like nature of light. The entanglement occurs when a pair of photons of the stream interact physically. The laser is fired through the slit which may be a certain type of crystal, which then causes individual photons to be split into pairs of entangled photons. When observed, a photon (photon 1 for exemplar purposes) of the pair takes on an up-spin state while photon 2 of the pair takes up a state relative to photon 1, here, that state is an up-spin state. The transfer of state between photon 1 and photon 2 takes place at a speed of at least 10,000 times the speed of light, possibly instantaneously, regardless of physical distance between the two photons.

It has been shown that if any attempt is made to measure which slit an individual photon of light passed through on the way to the screen then the interference pattern vanishes and is replaced by two spots of light, one behind each slit. Quantum theory observes that this phenomenon is the result of photons existing in a quantum superposition, i.e., existing simultaneously at both slits. The photon thus interferes with itself according to known wave mechanics. Quantum theory also observes that if the actual position of the photon is measured, then it no longer exists in a quantum superposition; its state is strictly at one slit or the other. This is because the photon is no longer at both slits simultaneously and can no longer interfere with itself. It is generally accepted that it is not possible to determine whether a given photon has or has not interfered with itself and that photons are subject to superposition collapse, rendering such measurements difficult and not commercially viable. Interference is an aggregate phenomenon, becoming apparent only when a significantly large number of photons have arrived at the screen. It is well known in the art that precise computations of how many photons must be observed before one can conclude with reasonable confidence that interference is not occurring. Notably, atomic structure is not susceptible to superposition or superposition collapse and is therefore is one predominant focus of the method disclosed herein.

Quantum entanglement of light is also known in the art—the results of which have been confirmed by numerous experiments. When two photons are emitted simultaneously or quasi-simultaneously by the same entity, the photons are entangled. The photons have a common wave function that is written as:

$$|\Psi>_{AB}=1/\sqrt{2}[|0>_A(x)|1>_B-|1>_A(x)|0>_B]$$

Where x is a tensor product.

Recently, quantum light, or photon, entanglement experimentation has been shown useful, Specifically, Bremsstahlung gamma entanglement, also known as "braking radiation" or "deceleration radiation", is the electromagnetic radiation produced by the acceleration of a charged particle, such as an electron, that is deflected by another charged particle, such as an atom nucleus. This effect has been shown to be useful for radiation that is produced by the deceleration of a charged particle when deflected by another charged particle. The moving particle loses kinetic energy which is converted into a photon. Bremsstrahlung gamma entanglement has a continuous spectrum, which becomes more intense and whose peak intensity shifts toward higher frequencies as the change of the energy of the decelerated particles increase. The maximum radiation frequency is related to the kinetic energy of the electrons by the relationship:

$$E = h\nu_{max}$$

And therefore the minimum value for the wavelength of the emitted radiation is shown:

$$\lambda_{min} = \frac{c}{\nu_{max}} = \frac{hc}{E}$$

In application and in addition to resonance ring exposure, nuclear magnetic resonance or magnetic resonance (NMR/MR) fields have been used to produce entangled particles. NMR is a physical phenomenon in which nuclei in a magnetic field absorb and re-emit electromagnetic radiation which therefore allows the observation of specific quantum mechanical magnetic properties of the atomic nucleus. The principle of NMR/MR involves two sequential steps: (1) the alignment, i.e., polarization of the magnetic nuclear spins in an applied, constant magnetic field; and (2) the perturbation of this alignment of the nuclear spins by employing an electro-magnetic, usually radio frequency pulse. The required perturbing frequency is dependent upon a static magnetic field and the nuclei of observation. As shown in FIG. 2, generation of spin-aligned particles can be achieved by exposing particles to an NMR/MR field in combination with pulsed radio frequency bombardment to entangle the particles by aligning the spins of the particles. These particles are then released from the field and entangled. They can be tested and used to produce a signal for detection in various forms of energy shifts.

Various other methods can be used to generate entangled photons capable of exciting luminescent substrate materials. One such method is cascade atomic emission of photons commonly emitted by mercury lamps. However, the cascade lines of mercury are at the edge of the excitation range and consequently produce low excitation efficiency. Another current method to produce entangled photons capable of exciting luminescent substrate materials is the use of a cathode ray tube. However, because the typical energy of excitation is of the order of 3 eV, or 360 nm, numerous phosphor molecules must be excited by the same electron or x-ray in a quick succession. Additionally, beams of entangled photons have also been produced with non-linear crystals such as barium borate oxide (BB) or lithium triborate (LBO) pumped with an exciser laser beam. However, for exciting photoluminescent pigments with an excitation spectrum, the optimum wave length is only approximately 386 nm requiring an excimer laser with a wavelength of 193 nm. This wavelength is at the limit of transparency of BBO and LBO and are therefore not commercially viable method applications. It has further been shown that in magnetic materials, and at very low temperatures. i.e. at super cooling temperatures, electron motion does not stop and entanglement may be created. Electron spins are entangled in pairs and the innate bond between the electrons keep the pair from freezing—contrary to what classical physics had previously predicted.

Alternatively to NMR/MR or supercooling methods, other conventional methods of absorbing entangled particles into the nucleus a substrate are known in the art. Entanglement swapping is one such method. Electron accelerators are known efficient tools for irradiating substrate materials, including thermoluminescent substrates where entangled electrons can be stored. As shown in FIG. 3 the conventional type of entanglement swapping shows that if a measurement is made simultaneously on element (B) and (D) of the entangled pairs (A)(B) and (C)(D), the entanglement on pairs (A)(B) and (C)(D) collapses, but the elements (A) and (C) become entangled although elements (A) and (C) have never been in contact previously. As shown in Prior Art FIG. 4 two entangled gamma (0) and (1) interact simultaneously with two electrons (2) and (3) in a crystal. Electrons (2) and (3) become entangled while the entanglement between (0) and (1) collapses. The entangled electrons are then captured in traps within the crystal and have been shown to remain in the traps for months to years at ambient temperature. Applied to luminescence, the probability of release of trapped electrons is assumed to be:

$$p = A\exp\left(\frac{-E}{kT}\right)$$

Where A is a constant, p is the probability of release of trapped electrons, E is the trap depth, i.e., energy, k is the Boltzmann constant, and T is the absolute temperature.

Most recently, experimentation has included samples of doped lithium fluoride as thermoluminescent dosimetry (TLD) material that were irradiated together at one location in order to create entangled photon traps in spatially collocated TLD chips via simultaneous Bremsstrahlung irradiation of a medical accelerator on spatially collocated pairs of TLD chips. It was thus demonstrated that in the case of non-entangled electrons in traps of thermoluminescent substrate materials, the traps begin emptying as soon as the temperature generates photons with an energy sufficient to trigger the emptying of the electron traps. Further, thermally heating a sample A in location 1 produced in the corresponding sample B in location 2 measured under a photomultiplier in location 2 at ambient temperate, correlated signals while the TLD temperature was increased then allowed to decrease by turning off the TLD heating over in location 1. It was determined that maximum temperature of the TLD attained in location 1 corresponded exactly with the instant of maximum correlation of photomultiplier tubes signal record in location 2. Thus, by way of example, it has been demonstrated that remote interaction between two entangled photons can be achieved in a slave chip relationship.

Currently, as shown, most methods include photonic systems requiring photon entanglement. This traditional approach has a number of deficiencies. For one, the use of photons that are entangled can only be used in a line of sight or through cabling. These limitations of using entanglement on traditional infrastructures reduce the strength of entanglement between photons and open the system to vulnerabilities such as interference, and a reduction in the ability to utilize entanglement swapping to both intercept and also integrate the source with the system.

Conventional photonic entanglement systems are further deficient in that these systems focus on a single photon position or the distances that can be achieved between entangled photons wherein the connection remains rather than the production of more robust forms of particle entanglement and enhanced forms of atomic structure manipulation generated by such robust entanglement.

The difficulties presented with traditional photonic entanglement systems are intensified when coupled with the fact that entanglement has shown to be fragile in the photonic state. Producing entanglement between particles requires that the particles start in a highly ordered state which is disfavored by thermodynamics. Accordingly, the very creation of entangled photons is a difficult process requiring expensive and complex experimental configurations. The fragility of the entanglement between photons results in either nominal quantum information transmission not detectable in any meaningful way or the pair collapses prior to any meaningful detection. Specifically, these pairs break easily during transmission due to noise or optical losses. For example, in the experiment requiring doped TLD chips noted above, heating and cooling the chips was used to show photon signal transfer. However, over time this process of heating and cooling removes the entanglement in the chip.

As such, it remains a challenging, if not impossible, to realize entanglement at the macroscopic scale, for example in proteins, and among n number of particles. While conventional systems provide an example of quantum entanglement, these systems do not correspond to systems attempting to entangle atomic matter particles which require additional consideration of spin, size, and nuclei swapping capabilities. Even when concentrated, photons only emit for a short duration with limited stability. In contrast, the present invention presents a particle entanglement system that produces detectable emissions that are long lasting, more durable and more commercially viable than known photon entanglement systems.

Still further, conventional photon entanglement systems are ultimately limited by the natural concentration of entangled particles allowed by traditional methods of producing such quantum light entanglement. These systems rely on an input of a naturally occurring concentration of photons in the photon stream. These systems also only measure the position or preposition of the photonic transition stream rather than a movement or thermal transition or thermal transfer or the like between molecular structures. Specifically, it has been shown that during conventional measurement, the position of the photon stream readily collapses producing uncertainty in detection and collection.

One advancement that has taken place to overcome the deficiencies of traditional photon entanglement systems is the use of an amplification system that restores the quantum properties of light in a light by mixing a light pulse in the channel with a single auxiliary photon in a beam splitter. A single photon detector was then placed at one of the outputs of the beam splitter. This solution, however, has its deficiencies. Namely, because the current state of the art only uses single photon positioning measurements and amplification rather than thermal transition or transfer measurements, detection of entanglement is difficult if more than two photons cannot be entangled. Further, when the experimental input is not controlled, only the naturally occurring photon entanglement occurs in small amounts and therefore, the results must be extrapolated over small results over miniscule, less stable structures. Consequently, the transmission of the entangled photons is not a useable item for detection, thermal transition or transfer, or experimental or practical manipulation for industrial and commercial purposes.

Further, current quantum computers need to be cooled to 15 miliKelvin, or about 1,000 times colder than space which requires large energy consumption. Additionally, the time that an entangled photon existing as a qubit in a conventional system is only approximately 0.000005 seconds. As such, the systems and methods have a lack of stability and sustainable, commercialized use.

These current advancements are still coupled with the traditional limitations photon entanglement systems. Additionally, these methods do not produce robust entangled pairing of atomic matter and as such have shorter duration and less durability than is commercially viable. Each method for man-made entanglement thus far has resulted in isolated, small, naturally occurring results for laboratory analysis purposes. As such, these methods are not suitable for commercial applications including, but not limited to, repeated remote control in a synchronous or asynchronous fashion of macro or micro atomic structures within substrates, or geothermal sources entangled with smaller commercial heating/cooling units because naturally occurring entangled particles are not produced at a concentration usable for efficient, durable, and detectable commercial applications. In sum, while it is acknowledged that all materials have some degree of baseline entanglement, the nature of the entanglement is disorganized. As such, the current method increases the commercial viability of entanglement by creating an increased concentration, organization, and separation of particles such that specific pairs, groups, clusters and the like are created and then manipulated in various applications including but not limited to, remotely controlling substrates.

Thus it is a primary objective of this invention to provide unnaturally concentrated quantum entangled particles and a method of making the same that improves upon the art.

Another objective of this invention is to provide unnaturally concentrated quantum entangled particles with longer duration time that is commercially viable.

Yet another objective of this invention is to provide unnaturally concentrated quantum entangled particles with greater durability and therefore less susceptible to collapse than unconcentrated quantum entangled particles.

Another objective of this invention is to provide unnaturally concentrated quantum entangled atomic matter particles rather than photons.

Yet another objective of this invention is to provide unnaturally concentrated quantum entangled particles to measure thermal transition between molecular structure rather than position or superposition of a photonic transition stream.

Another objective of this invention is to provide unnaturally concentrated quantum entangled particles capable of recovering entanglement.

Yet another objective of this invention is to provide unnaturally concentrated quantum entangled particles that increase measurement confidence by providing a large, easily detectable signal.

Another objective of this invention is to provide unnaturally concentrated quantum entangled particles by entangling atomic matter instead of photons of light.

Yet another objective of this invention is to provide unnaturally concentrated quantum entangled particles on a macroscopic level.

Another objective of this invention is to enhance entanglement signal transmission by using chromatic shift.

Yet another objective of this invention is to provide unnaturally concentrated quantum entangled particles that produce detectable and commercially applicable thermal exchange.

Another objective of this invention is to provide unnaturally concentrated quantum entangled particles that produce detectable and commercially applicable emissions.

Yet another objective of this invention is to provide unnaturally concentrated quantum entangled particles after overwriting previous concentrations of entanglement.

Another objective of this invention is to provide reliable manipulation of valence distance and structure.

Yet another objective of this invention is to provide reliable and robust entanglement and manipulation of unlike atoms to create super atoms.

These and other objectives, features, and advantages of the invention will become apparent from the specification and claims.

SUMMARY OF THE INVENTION

In general, the present invention relates to unnaturally commercially viable concentrated and separated quantum entangled particles that are macroscopic and slave related, and a method for making the same. Entangled particles include photons, electrons, protons, neutrons, leptons, neutrino, muon, muon neutrino, tau, tau neutrino, quarks, gauge bosons, Higgs boson, and atomic and subatomic particles of the like. It is to be understood that although the use of photons as particle matter is include here, applications using photons and photonic excitation for exhibiting entanglement are deficient as disclosed herein. The invention anticipates that the method could be used to increase the entanglement produced by photonic excitement such that the natural and prior art deficiencies are reduced or eliminated. The method includes streaming and filtering beams of particles, splitting the beams in or to separate the particles, entangling the particles of the split beams through a correlation system and release therefrom thereby increasing the percentage of quantum spin alignment among the particles, and applying the split stream of particles to a substrate such that a slave state relationship is created between particles and between substrates. For example, a substrate could include an ionic material capable of absorbing the particles. Such an ionic material includes material that is in need of an electron and the stream of particles would include electrons. The particles are then collected or "trapped" within the material.

Alternatively, the particles may be embedded in the substrate prior to exposure to the correlation system. Though polarization and filtration of particles is a process by which the current method can be accomplished, filtration has a residual non-sorted particle groups that escape through the filter and interferes with the overall effectiveness of the concentrated entanglement process. As such, there are additional methods described below that produce nearly 100% percent entanglement in particles throughout a substrate. These alternative methods include magnetic resonance, super cooling, and resonance ring exposure.

In another embodiment, the method further includes providing a stream of particles, exposing the stream of particles to a resonance ring with no splitting as the resonance ring has two or more streams and the particle quantum spins are aligned. Upon exiting the ring, the particles are entangled at a high concentration. The entangled particles can be utilized to perform swapping of the entanglement into a substrate. Further still, the method also includes providing a stream of particles in a beam, filtering the beam of particles, splitting the beam of particles in order to separate the particles, entangling with the separated particles through substitution, and applying the stream to material that can absorb the particles. Specifically, the present invention includes the polarization of a particles stream along two or more axes that are perpendicular to each other and to the direction of travel of the particle. The axes become H for horizontal and V for vertical by way of example even though there is no requirement that these axes have any particular absolute orientation, only that they are right angles to each other. As such, Heisenberg's uncertainty principle demonstrates that the more precisely the polarization along the H axis is determined, the less precisely the polarization along the V axis can be known and vice versa.

In the alternative, the method includes placings a substrate in a chamber, generating via the chamber either cooling, cooling combined with a magnetic field, or a magnetic field alone. Then applying pulsed radio frequency to the substrate, aligning the spins of the particles, and releasing the particles and/or substrate from the magnetic field and/or cooling. After each iteration described above, the substrate is then capable of stimulation and manipulation steps described in further detail below.

Specifically, to accomplish an increase concentration, separation, and organization of the entangled matter, particles may be swapped into the structure by altering the atomic state of the substrate to allow the entanglement swapping of the quantum entangled atomic particle stream into the atomic structure of a substrate. The particles may be swapped directly into the atomic structure. The quantum entanglement of the matter and commercially viable concentration, separation and organization of the entangled matter may also be created and transferred into the structure of at least one substrate by nuclear magnetic resonance field exposure or supercooling of the substrate desired to be entangled, in combination with pulsed radio frequency bombardment in order to prep the substrate to have the nuclei of the quantum entangled matter particles and the substrate align thereby creating a substrate embedded with quantum entangled atomic matter particles. The pulsed radio frequency bombardment is applied in order to turn the quantum entangled atomic particle spins to a common direction. Various forms of supercooling are applicable, including but not limited to standing wave manipulation in order to achieve supercooling, resonance ring or laser exposure. Resonance ring exposure behaves similarly to that of NMR exposure. Separated quantum entangled particles are then collected into the atomic structure of the substrate or, depending on the nature of the particular particles used, interact with the atomic structure of the substrate or, number of substrates thereby creating a slave-x relationship between substrates.

The method further includes the step of stimulating the interacted quantum entangled atomic particles such that a detectable change may be observed. Stimulation may occur by applying a light spectrum that stimulates the inner valiance structure of the embedded or associated quantum entangled atomic particles. Stimulation may also include photonic, physical, electromagnetic, other quantum entangled particles, magnetic, gravitational, and other like forces. The stimulation causes a change in an attribute of the embedded quantum entangled atomic particles and releases a stream of detectable chromatically shifted light due to the control of the valence structure or particles in the valence structure, not in the light spectrum used in the stimulation process.

The method further includes selectively detecting diffraction or color shifts in order to determine whether a change in band gap, release of small amounts of energy from the valence bonds of the entangled particles due to the excitation to the relaxed state of the electrons within the valence bonds, release of quantum entangled atomic particles from the lattice structure of a substrate, a change to the lattice structure of the substrate, or a change to the bond strength of the substrate has occurred.

In sum, because a concentration of more than a few, short-lived and unstable entangled particle states occur in nature, a concentrated entangled state is desirable to enhance the connectivity and manipulative capability of entangled particles toward commercial viability. Two particles can be connected such that the state of one entangled photon can instantly influence the state of the other, no matter how spatially far apart the photons are in a slave-x relationship. A variety of commercial applications arise from these advancements, including but not limited to, use in radiotherapy treatments, wiretapping applications, semiconductor fabrication, biologics, light emitting diode (LED) fabrication and control, and quantum sensors that use entanglement as a resource for overcoming the sensitivity limit of traditional, non-quantum, sensors. With the creation of concentrated quantum entangled particles, the potential commercial applications drastically increase in number as well as in commercial strength and longevity.

DETAILED DESCRIPTION

Figure 1:
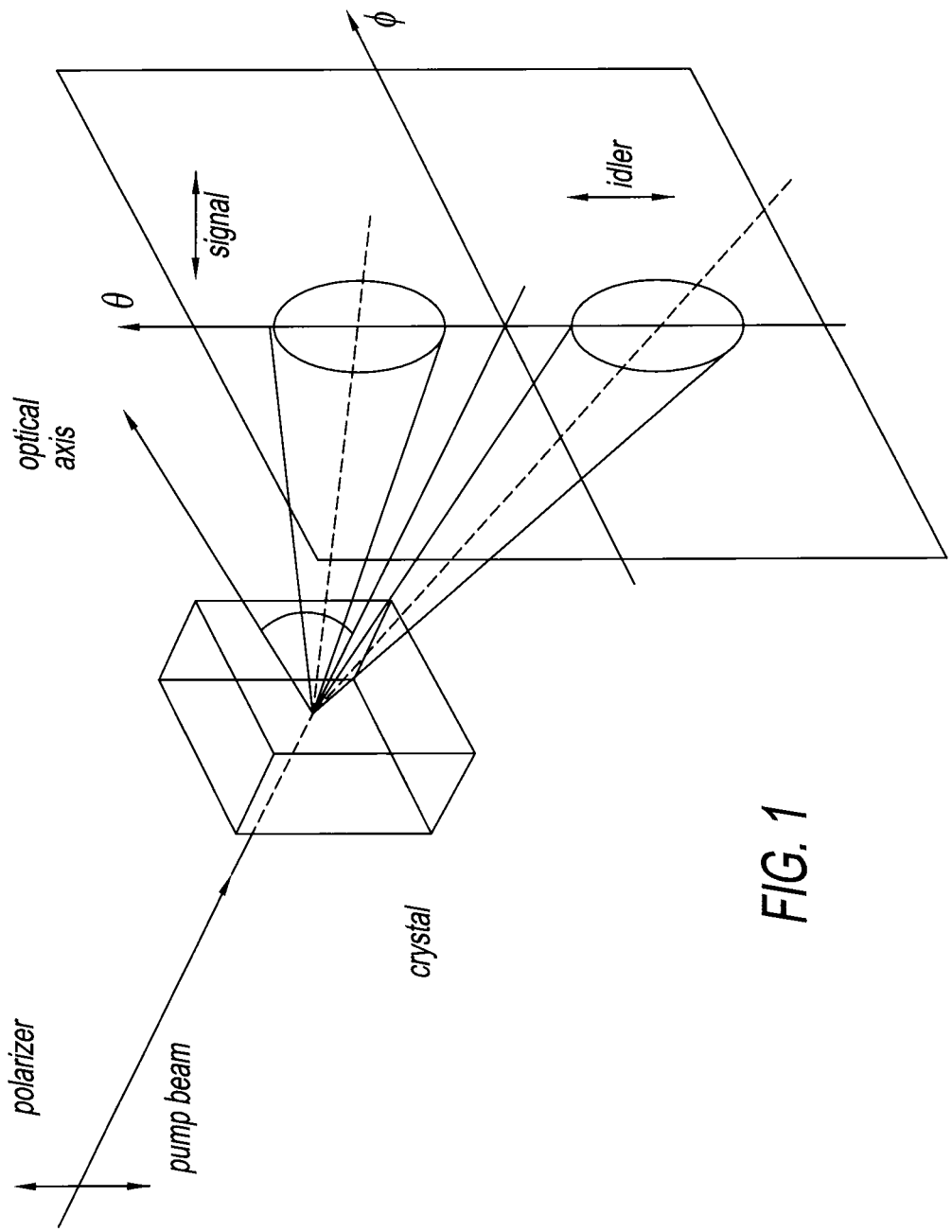
FIG. 1 is a prior art illustration of a split beam filtration system.
Figure 2A:
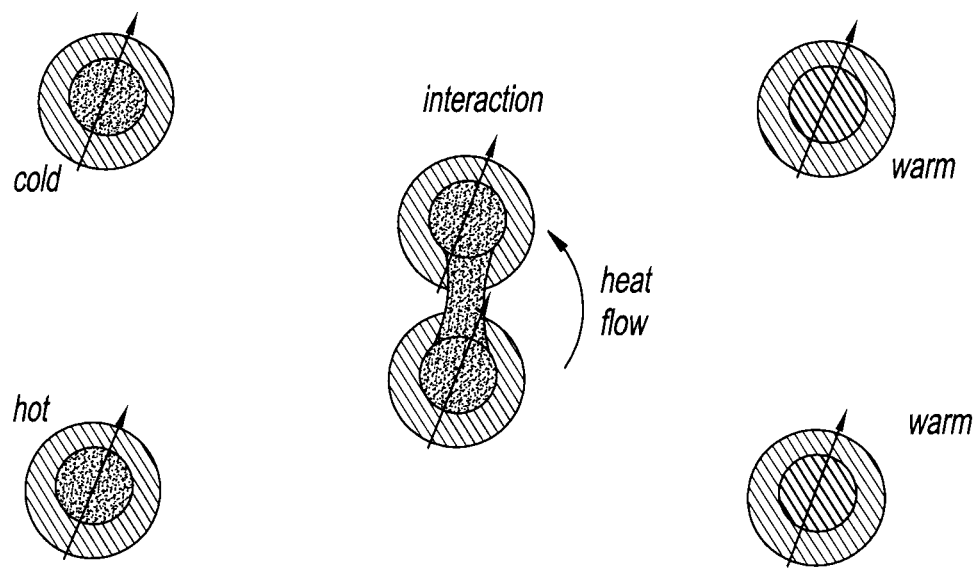
FIG. 2A is a prior art illustration of NMR/MR uncorrelated spin alignment.
Figure 2B:
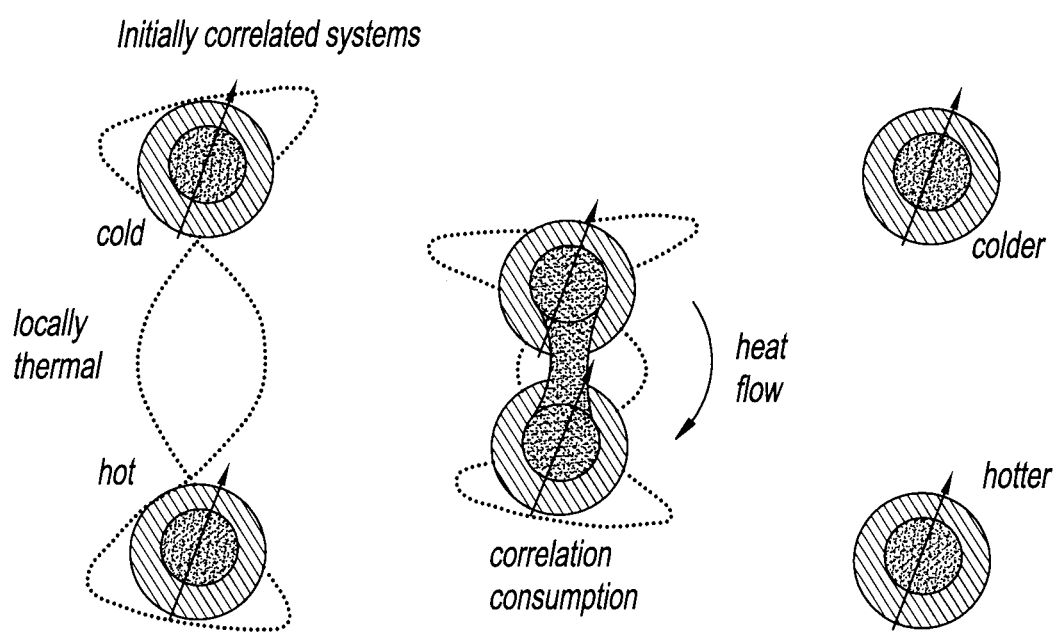
FIG. 2B is a prior art illustration of NMR/MR correlated spin alignment.
Figure 3:
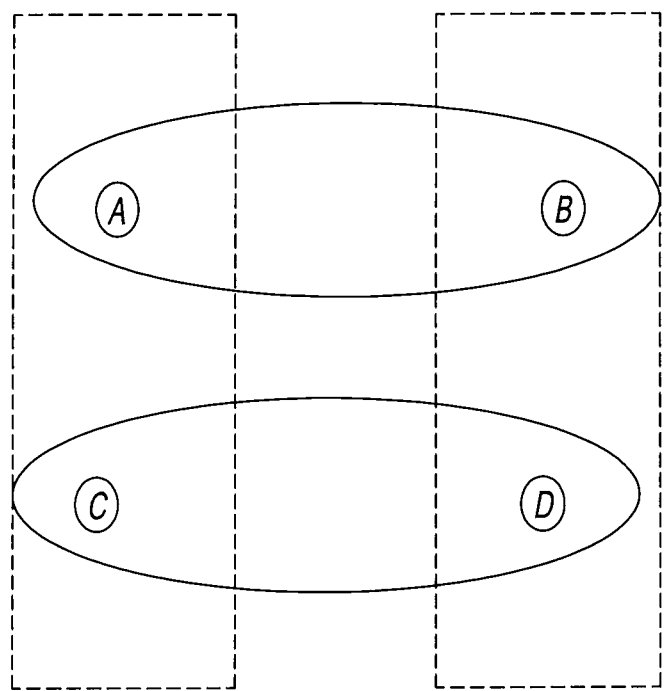
FIG. 3 is a prior art illustration of entanglement swapping.
Figure 3:
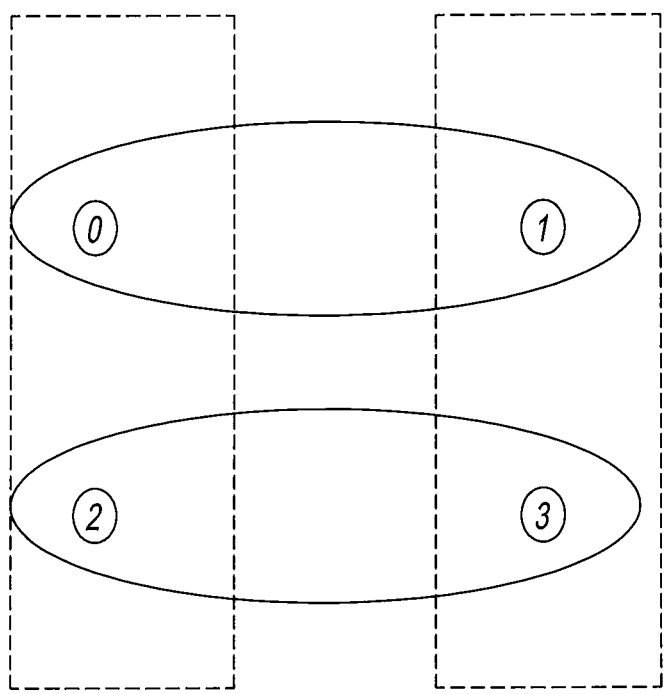
Figure 4:
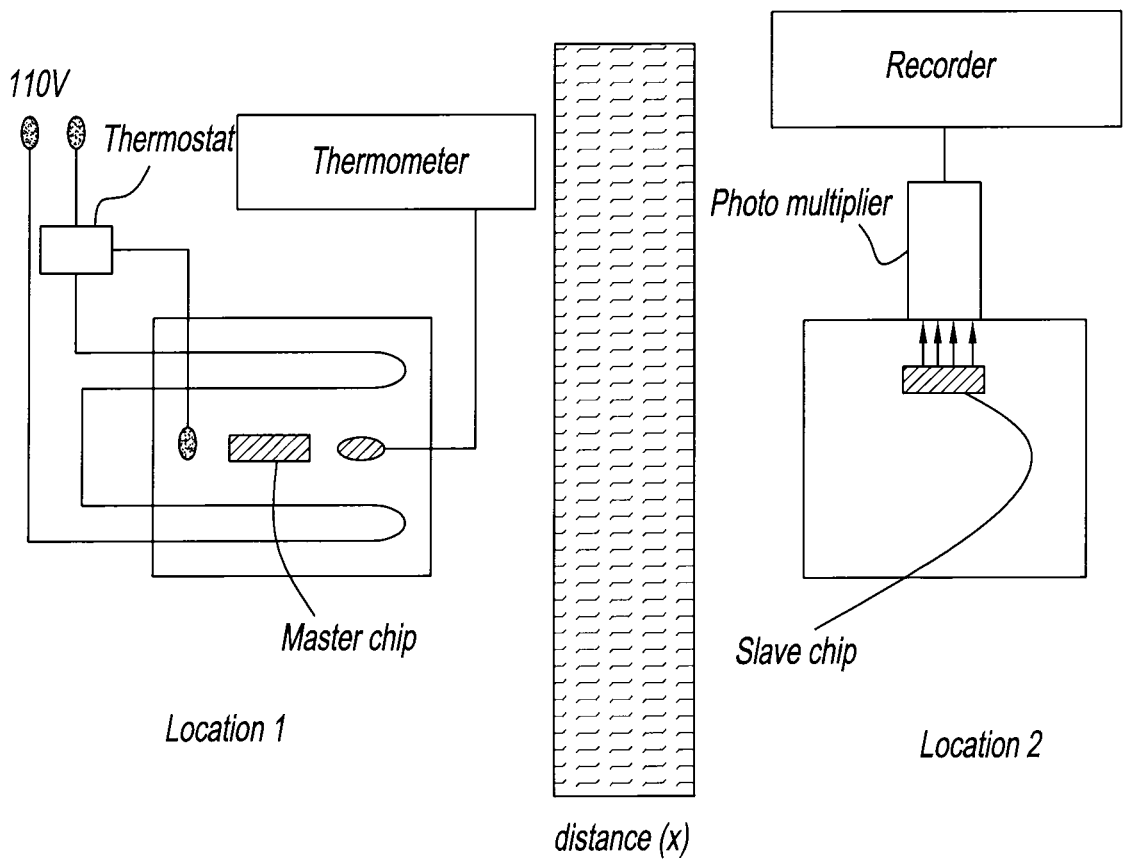
FIG. 4 is a prior art illustration of a slave chip system
Figure 5:
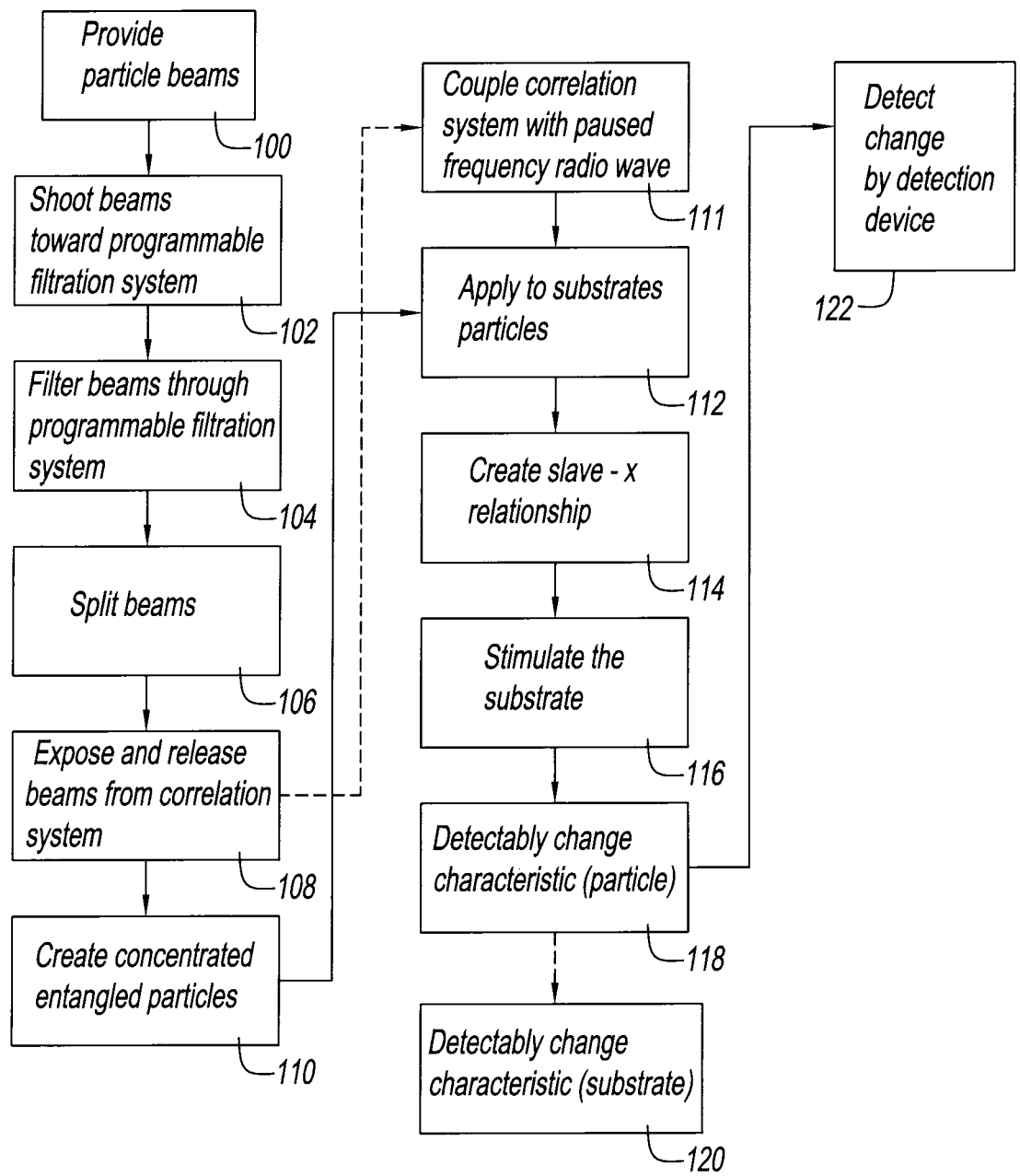
FIG. 5 is a schematic view of a method for concentrated quantum mechanically entangled particle couples.
Figure 6:
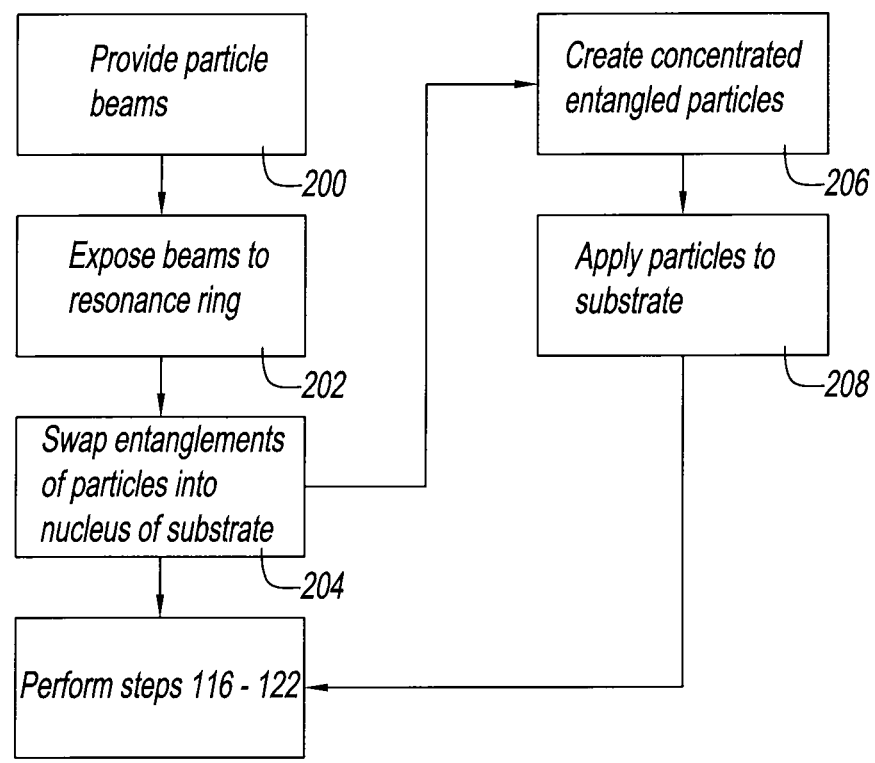
FIG. 6 is a schematic view of a method for concentrated quantum mechanically entangled particle couples.
Figure 7:
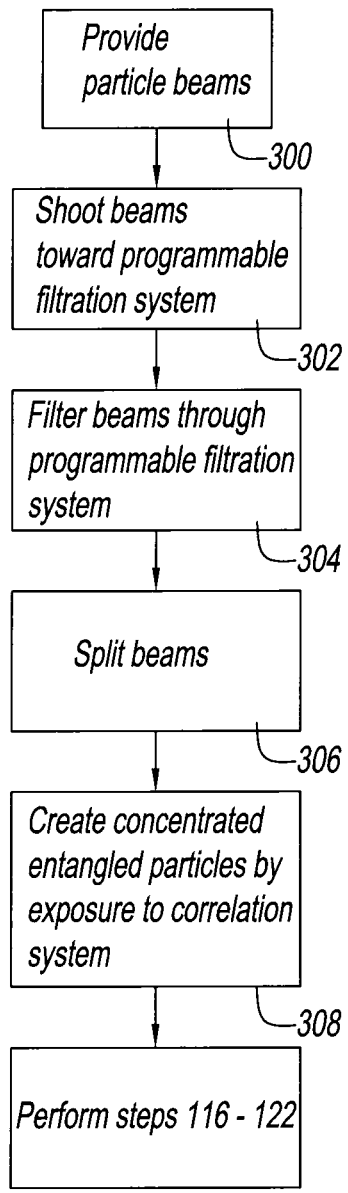
FIG. 7 is a schematic view of a method for concentrated quantum mechanically entangled particle couples.
Figure 8:
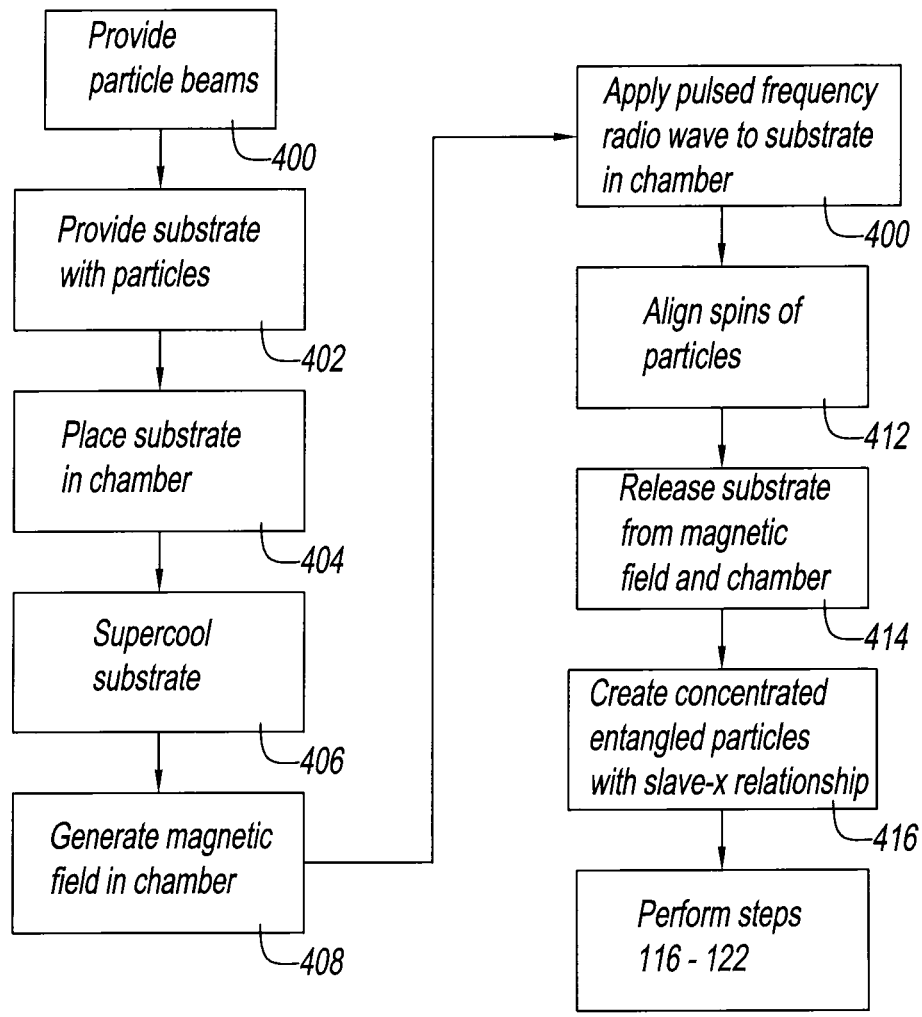
FIG. 8 is a schematic view of a method for concentrated quantum mechanically entangled particle couples.
Figure 9:
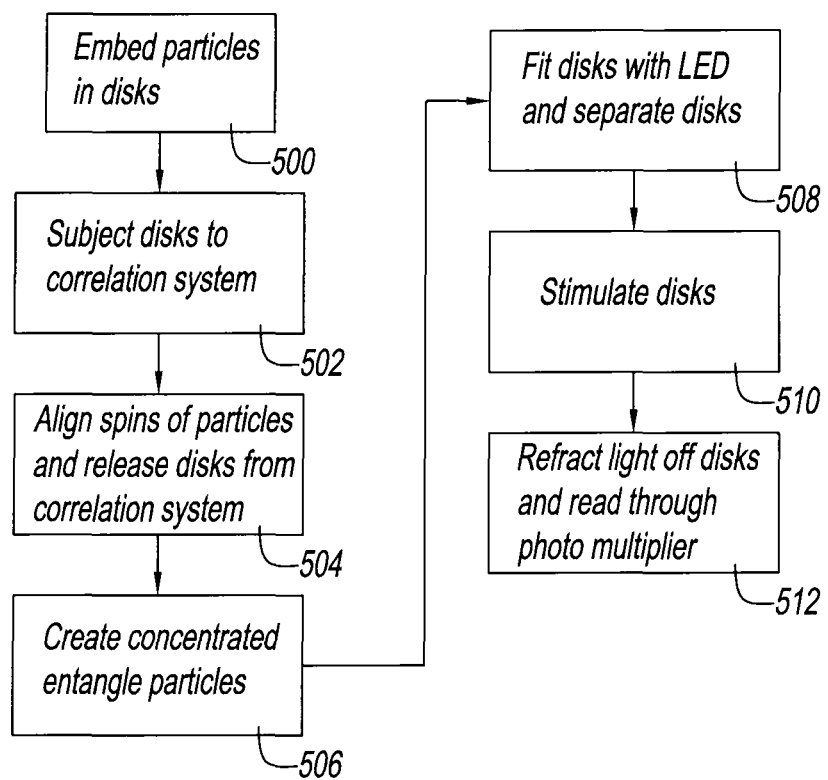
FIG. 9 is a schematic view of a method for concentrated quantum mechanically entangled particle couples.
Figure 10:
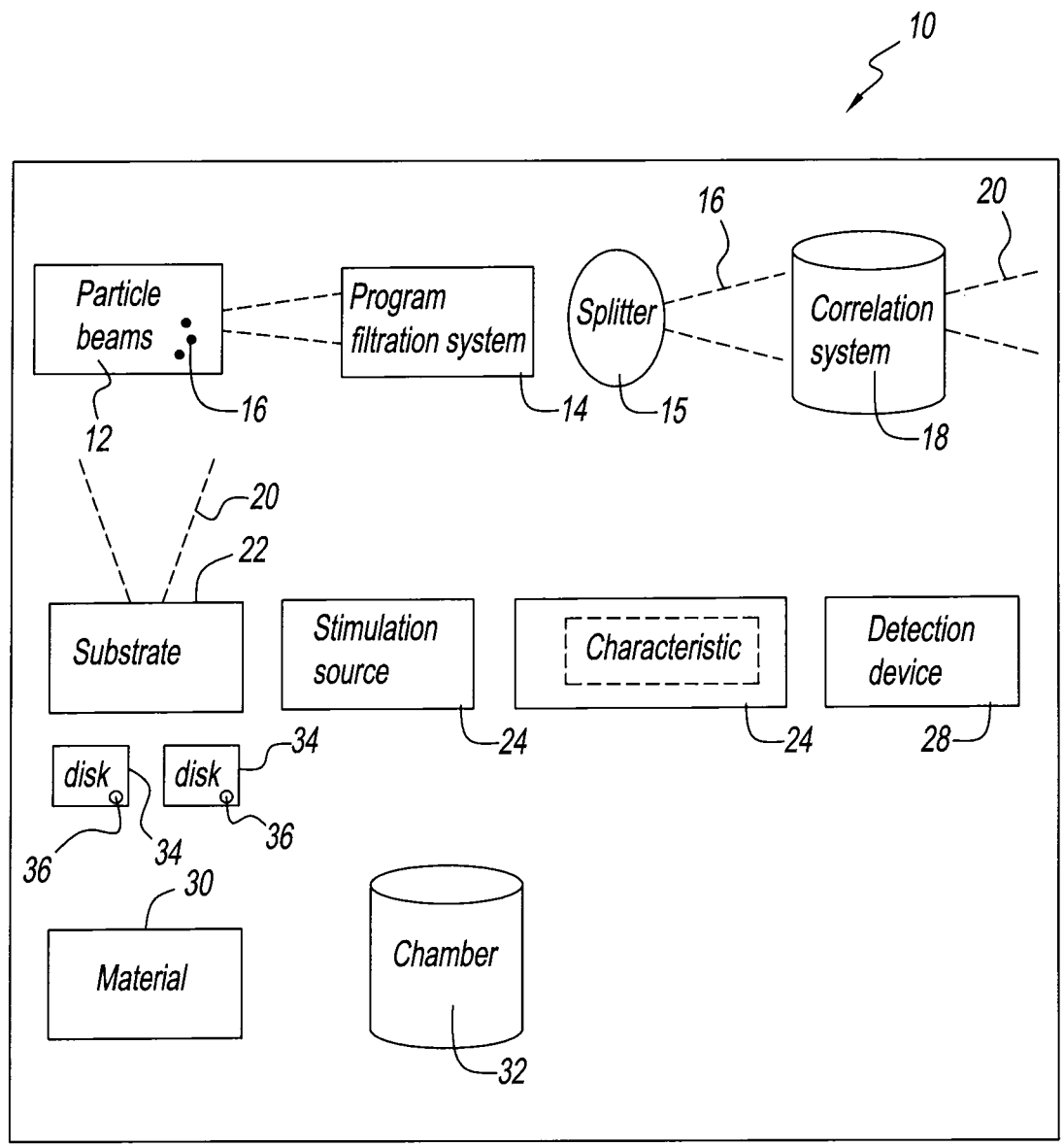
FIG. 10 is a schematic view of a system for a method for concentrated quantum mechanically entangled particle couples.

For the purpose of the specification and the claims:

The term "quantum entanglement" refers to the physical phenomenon which occurs when pairs or groups of particles are generated or interact in ways such that the quantum state of each particle cannot be described independently of the state of the other(s), even when the particles are separated by a large distance, and thus a quantum state must be described for the system as a whole. It is understood that naturally occurring concentrations of quantum entangled particles exist at concentrations that are not commercially viable, separated, or organized into durable, sustainable pairs, beams, groups, or clusters. The present invention is not directed at naturally occurring concentration of quantum entangled particles.

The term "commercially viable quantum entangled particles" refers to synthetically concentrated quantum entangled particles at a concentration, separation, and organization as a result of the application of the present invention's correlation systems as defined below such that the particles can be stimulated and manipulated on a macro-scale in various industry practices including but not limited to circuitry and biological protein developments.

The term "entanglement clusters" refers to groups of quantum entangled particles.

The term "entanglement swapping" refers to the transference of pairs or groups of quantum entangled particles that originate from difference sources and formerly completely independent. The swapping is the transfer of entanglement by collision from one entangled particle to a non-entangled particle, therefore leaving the previously entangled particle no longer entangled as the entanglement has been transferred to the now entangled particle.

The term "substrate" refers to a medium with which the unnaturally concentrated quantum entangled particles interact with; including but not limited to microchips, compounds, atoms, gasses, liquids, proteins, chromogenic complexes, thermogenic complexes, nuclei, or atomic structure therein.

The term "correlation" refers to the spin of the particles such that when a correlation system is applied to the particles, any previous concentration of entanglement is overwritten and also such that when the spins of the particles become correlated and then released, remote control capabilities of the pairs or groups of entangled particles is created.

The term "correlation system" refers to systems methods applied to the particles such that natural entanglement of the particles is overwritten, separated, and organized entangled particles are created and subsequent interaction between the entangled particles and a substrate is created.

The term "remote control" refers to the ability to manipulate quantum entangled particles or groups of quantum entangled particles while creating the effects in other corresponding quantum entangled particles or groups of quantum entangled particles at any distance.

The term "super molecule" refers to entanglement of two or more molecules, for example, oxygen in combination with hydrogen.

The term "slave chip relationship" refers to the depositing of entangled particles in two or more microchips wherein the entangled nature of the embedded particles causes interaction between the microchips such that, even at great spatial distance, when particle embedded in one microchip is stimulated to manipulated, one or more particles are similarly stimulated or manipulated. It is understood that the term could include other substrates that are not microchips and are therefore a "slave-x relationship" wherein x could be any number of substrates or particles.

With reference to the Figures, the system for concentrated quantum mechanically entangled particle couples and method for making the same 10 includes providing a particle stream within at least one particle beam 12 at step 100. In one embodiment, a pair or groups of particle beams 12 are selectively combined such that particles 16 within the beam or beams 12 correspond to each other from each pair or group of particle beams 12. The entanglement of the particles 16 within the beams 12 is of a natural concentration, separation, and organization and is therefore not commercially viable. At step 102, the beams 12 are shot toward a programmable filtration system 14. At step 104, the beams 12 are filtered through the programmable filtration system 14. At step 106, the beams 12 are split such that entangled particles are separated by splitter 15 material such as a crystal.

The particles 16 are exposed to a correlation system 18 and released therefrom after exposure at step 108, thus creating commercially viable, concentrated, separated, and organized entangled particles 20 at step 110. Correlation systems 18 may include NMR/MR, supercooling, resonance ring manipulation, ionic material bonding, and entanglement swapping. Correlation systems 18 may be used alone or in tandem with other correlation systems in sequential exposures. In one embodiment, the correlation system 18 is coupled with pulsed frequency radio wave exposure at step 111.

Commercially viable applications of the particles 20 may include geothermal heating techniques, slave chip relationships, crystal matrix manipulation, and the like. The particles 20 may be pairs, groups of pairs, groups, clusters, or any combination thereof. The particles 20 survive for a duration longer than untreated particles 16 and have greater resistant to superposition collapse than untreated particles 16. In one embodiment, the particles 20 are approximately 90%-99% concentrated such that 90%-99% of all particles 20 are entangled when the correlation system includes NMR/MR or supercooling. In another embodiment, at least 60% of the particles 20 are entangled when entanglement swapping is the selected correlation system 18. It is envisioned that post-correlation system exposure filtration and particle selection may improve these percentages.

At step 112, the split stream containing the particles 20 is applied to a substrate 22 thus creating a slave-x relationship between the particles 18 and between the substrates 22 at step 114. In one embodiment, the split stream 21 of particles 20 is applied to multiple substrates 22. Applications may include absorption, diffraction, bonding, or reacting thereto. The substrate 22 may include compounds, crystals, atoms, gasses, atomic structures, proteins, enzymes, microchips, liquids, chromogenic complexes, and thermogenic complexes. The particles 20 have entangled states that are long lived, durable and are positioned throughout the substrate 22. In one embodiment, step 104 may be repeated at various times throughout the method 10.

In one embodiment, at step 116, the substrate 22 is stimulated by a stimulation source 24. The stimulation source 24 may include photonic, physical, electromagnetic, additional quantum entangled particles bombardment, magnetic, gravitational, and other stimulation forces of the like. In one embodiment, the stimulation source 24 is a light spectrum that stimulates inner valence structure couples of the substrate 22 or particles 20 to produce a release of light not in a frequency of the light spectrum used as the stimulation source 24.

At step 118, at least one characteristic 26 of particles 20 is detectably changed. Alternatively, at step 120, at least one characteristic 26 of the substrate 22 is detectably changed. The at least one characteristic 26 includes at least one change in location of the particles 20, at least one change in excitation of the particles 20. In one embodiment, a combination of detectable changes in the at least one characteristic 26 is generated. Alternatively, a chromatic shift is generated by the stimulation step at 116 and subsequent relaxation of the particles 20 is measurable on a macroscopic level and recorded.

At step 122, for quality assurance purposes, the detectable change in the at least one characteristic 26 is detected by a detection device 28. The detection device 28 detects the effects of the stimulation process from step 116. These effects include a change in the band gap of the atomic structure of the substrate 22, the release of energy from the valence bonds of the substrate 22 or the particles 20, release of particles 20 from a lattice structure of the substrate 22, a change to a lattice structure of the substrate 22, or a change in the bond strength of the substrate 22.

At the conclusion of step 112, the particles are remotely controllable. Remotely controllable for commercial purposes includes repeatable instances of control, physical control, synchronous control, asynchronous control, and the like of the particles 20, the substrate 22, or both creating a slave-x relationship. For example, remote control occurs when one particle 20 is manipulated in any desired way, the effect occurs and is observable on the macroscopic level on a corresponding particle 20, which may be within the same substrate 22 or a different substrate 22 placed at a distance from any other substrate 22. Alternatively, when a cluster of particles 20 is manipulated in any desired way, the effect occurs and is observable on the macroscopic level on the corresponding cluster of particles 20, which may be within the same substrate 22 or a different substrate 22 placed at a distance from any other substrate 22.

Alternatively, the method 10 includes providing a particle stream 12 within at least one particle beam at step 200. In one embodiment, a pair or groups of particle beams 12 are selectively combined such that particles 16 within the beam or beams correspond to each other from each pair or group of particle beams 12. The entanglement of particles 16 within the beams 12 is of a natural concentration, separation and organization and is therefore not commercially viable. At step 202, the beams 12 are exposed to a resonance ring thereby splitting the beams 12. At step 204, entanglements of the particles 16 are swapped via an entanglement swapping correlation system 18. The resultant spin-aligned particles 20 are then released from the ring and correlation system creating commercially viable, concentrated, separated, and organized entangled particles 18 occurs at step 206. At step 208, the split beams 12 containing the particles 20 is applied to a substrate 22. In one embodiment, at the conclusion of step 204, the particles 20 are swapped directly into a nucleus or atomic structure of the substrate 22 thereby creating a slave-x relationship between the particles 10, substrates 22, or both. In one embodiment, the stream of particles 20 is applied to multiple substrates 22. In one embodiment, step 202 may be repeated at various times throughout the method 10. Thereafter, steps 116-122 may be performed.

In an alternative embodiment, the method 10 includes providing a particle stream within at least one particle beam 12 at step 300. In one embodiment, a pair or groups of particle beams 12 are selectively combined such that particles 16 within the beam or beams 12 correspond to each other from each pair or group of particle beams 12. The entanglement of the particles 16 within the beams 12 is of a natural concentration, separation and organization and is therefore not commercially viable. At step 302, the beams 12 are shot toward a programmable filtration system 14. At step 304, the beams 12 are filtered through the programmable filtration system 14. At step 306, the beams 12 are split such that entangled particles 16 are separated. The creation of commercially viable, concentrated, separated, and organized entangled particles 20 occurs at step 308 via exposing the particles 16 to a correlation system 18. The beams 12 now containing the entangled, commercially viable, separated and organized particles 20 is applied to a material 30 at step 310. The material 30 may be ionic and in need of an electron which would therefore require the stream of the particles 20 in the beam 12 to be electrons. In one embodiment, the stream of particles 20 is applied to multiple materials 30. In one embodiment, step 304 may be repeated at various times throughout the method 10. Thereafter, steps 116-122 may be performed.

Alternatively, the inventive method 10 includes providing a particle stream within at least one particle beam 12 at step 400. In one embodiment, a pair or groups of particle beams 12 are selectively combined such that particles 16 within the beam or beams 12 correspond to each other from each pair or group of particle beams 12. The entanglement of the particles 16 within the beams is of a natural concentration, separation and organization and is therefore not commercially viable. Step 402 includes providing a substrate 22 containing particles 16. In one embodiment, the substrate 22 is chemically doped microchips. In one embodiment, the chemical doping is achieved with thermoluminescent chemical application. In an alternative embodiment, the chemical doping is achieved with photoluminescent chemical application. At step 404, the substrate 22 is placed within a chamber 32. At step 406, the chamber 32 generates cooling of the substrate 22 to a supercooling degree. Supercooling may be achieved by using standing wave technology. Alternatively, at step 408, the chamber 32 generates a magnetic field. In one embodiment, the magnetic field is a nuclear magnetic resonance (NMR) field. At step 410, a pulsed radio frequency stream is applied to the chamber 32. The alignment of spins of the particles 16 occurs at step 412. At step 414, the substrate is released from either the supercooled stated applied at step 406 or the magnetic field generated at step 406 creating commercially viable, concentrated, separated, and organized entangled particles 20 having a slave-x relationship with each other at step 416. In one embodiment both supercooling and a magnetic field are generated by the chamber 32. Thereafter steps 116-122 may be performed.

In operation, and by way of example to further illustrate the commercial application, detectable change, and detection portion of the process in a specific setting subject to and without waiving the above embodiments, at step 500, the particles 16 are embedded in a selected substrate 22 a corresponding second substrate 22 which includes two small disks 34 doped with $AL_2O_3$:C. At step 502, the substrates 22 are subjected to a correlation system 18 having a magnetic field. At step 504, while positioned within the correlation system 18, the spins of the particle atoms 16 are aligned in the same direction thus creating a high concentration of entangled particles 18 within the substrates 22 at step 506. The particles 18 are released from the correlation system 18 thus creating a slave-x relationship between the particles 20 and between the disks 34. At step 508, the disks 34 are separated a distance from each other. In one embodiment, the disks 34 are fitted with an LED 36 which creates a detectable light output having, for example, a green light for "on" or one and a red like for "off" or zero. The disks 34 may then be stimulated at step 510 to exchange thermal gradients, magnetic fields, movement, or an adjustment of internal valance structures and the like. At step 512, light is refracted off of the disks 34, filtered through a programmable filtration device 14, and read through a photomultiplier. A shift in valence structure due to the entanglement state between the particles 18 and the disks 34 causes the LED 36 to be in the spectrum of the LED diode and thus read as a 1 or green. Alternatively, in a relaxed state and not stimulated, the light refracted is in the red spectrum, or zero.

From the above discussion and accompanying figures and claims it will be appreciated that the concentrated quantum mechanically entangled particle couples and method for making the same offer many advantages over the prior art. It will be appreciated further by those skilled in the art that other various modification could be made to the device without parting from the spirit and scope of this invention. For example, the additional methods of particle entanglement and particle stimulation as well as substrates extending beyond microchips are anticipated. It should be understood that the method may include different detection devices. All such modifications and changes fall within the scope of the claims and are intended to be covered thereby. It should be understood that the examples and embodiments described herein are for illustrative purposes only and that various modifications or changes in the light thereof will be suggested to persons skilled in the art and are to be included in the spirit and purview of this application.

What is claimed is:

1. A method for creating concentrated quantum mechanically entangled particle couples comprising:
   providing at least a pair of beams having particles;
   shooting the at least two beams toward a programmable filtration system having a splitter material;
   filtering the at least pair of beams through the splitter material such that the at least two beams are split;
   exposing the at least pair of beams to a correlation system such that spins of the particles are aligned;
   releasing the particles from the correlation system creating concentrated entangled particles; and
   depositing the concentrated entangled particles into at least two substrates.

2. The method of claim 1 further comprising stimulating the substrate with a stimulation source such that at least one characteristic of the concentrated entangled particles, substrate, or both is changed from its relaxed state.

3. The method of claim 2 further comprising detecting the change in the at least one characteristic by a detection device.

4. The method of claim 1 wherein the concentrated entangled particles are in a slave-x relationship with each other and remotely controllable upon release from the correlation system.

5. The method of claim 4 wherein the slave-x relationship between the concentrated entangled particles is asynchronous.

6. The method of claim 1 wherein the more than one substrates are in a slave-x relationship with each other and remotely controllable upon release from the correlation system.

7. The method of claim 1 wherein the correlation system is selected from a group consisting of entanglement swapping, magnetic field exposure, supercooling and resonance ring exposure.

8. The method of claim 1 wherein the correlation system is magnetic field exposure further coupled with pulsed frequency radio waves.

9. The method of claim 1 wherein the correlation system is magnetic field exposure and at least 90% of the concentrated entangled particles are entangled after release from the correlation system.

10. The method of claim 1 wherein the correlation system is supercooling and at least 90% of the concentrated entangled particles are entangled after release from the correlation system.

11. The method of claim 1 wherein the concentrated entangled particles are organized, physically stable, separated, and positioned throughout the substrate.

12. The method of claim 2 further comprising stimulating inner valence couples of the concentrated entangled particles to produce a release of light not in a frequency of the light spectrum used as a stimulation source.

13. The method of claim 1 where in the substrate is selected from a group consisting of compounds, crystals, atoms, gasses, atomic structures, proteins, enzymes, microchips, liquids, chromogenic complexes, and thermogenic complexes.

14. The method of claim 1 where in the concentrated entangled particles are in pairs, groups of pairs, groups, and clusters.

15. The method of claim 1 further comprising additional exposures to additional correlation systems in sequential order.

16. The method of claim 2 wherein the stimulation source is selected from a group consisting of photonic sources, electromagnetic sources, magnetic course, gravitational sources, and additional quam entangled particle bombardment.

17. The method of claim 2 wherein the at least one characteristic of the concentrated entangled particles is selected from a group consisting of chromatic shifting, particle energy excitation, particle energy relaxation, particle inner valence structure adjustment, particle location shifting, energy transfer between the particles, and band gap in an atomic structure of the substrate, energy release from substrate valence bond relaxation, release of particles from a lattice structure of the substrate, change in the lattice structure of the substrate, and a change in the bond strength of the substrate.

18. The method of claim 1 wherein the concentrated entangled particles survive for a longer duration and have greater resistance to superposition collapse than naturally entangled particles.

* * * * *